(12) United States Patent
Koser et al.

(10) Patent No.: US 7,944,343 B2
(45) Date of Patent: May 17, 2011

(54) SYSTEM AND METHOD FOR PROVIDING INFORMATION IN A VEHICLE

(75) Inventors: Uwe Koser, Ingolstadt (DE); Tilo Koch, Ingolstadt (DE); Markus Hörwick, München (DE); Tim Horenburg, Haar (DE); Anton Obermüller, Königsdorf (DE); Johannes Schmid, München (DE); David Jackson, Mountain View, CA (US); Michael Shyh-Yen Ho, Sunnyvale, CA (US); Edith Arnold, Stanford, CA (US); David Klaus, Menlo Park, CA (US)

(73) Assignees: Audi AG, Ingolstadt (DE); The Board of Trustees of the Leland Stanford Junior University, Stanford, CA (US)

( * ) Notice: Subject to any disclaimer, the term of this patent is extended or adjusted under 35 U.S.C. 154(b) by 708 days.

(21) Appl. No.: 11/868,529

(22) Filed: Oct. 7, 2007

(65) Prior Publication Data

US 2009/0091432 A1    Apr. 9, 2009

(51) Int. Cl.
*H04B 3/36* (2006.01)
(52) U.S. Cl. ................. 340/407.1; 701/36
(58) Field of Classification Search .......... 340/407.1, 340/425.5, 438, 500, 407.2; 701/41, 42, 701/36

See application file for complete search history.

(56) References Cited

U.S. PATENT DOCUMENTS

| 6,389,332 | B1 | 5/2002 | Hess et al. |
| 6,418,362 | B1 * | 7/2002 | St. Pierre et al. ........... 701/36 |
| 6,703,999 | B1 * | 3/2004 | Iwanami et al. ........... 345/158 |
| 6,707,421 | B1 | 3/2004 | Drury et al. |
| 6,717,376 | B2 | 4/2004 | Lys et al. |
| 6,812,860 | B1 | 11/2004 | Schwarzwalder, Jr. |
| 7,382,274 | B1 | 6/2008 | Kermani et al. |
| 7,602,278 | B2 * | 10/2009 | Prost-Fin et al. ........... 340/438 |
| 7,605,694 | B2 * | 10/2009 | Prost-Fin et al. ........... 340/438 |
| 7,680,574 | B2 * | 3/2010 | Berg et al. ........... 701/41 |
| 2004/0104887 | A1 | 6/2004 | Tsukamoto et al. |
| 2004/0117084 | A1 | 6/2004 | Mercier et al. |
| 2005/0030166 | A1 | 2/2005 | Kraus et al. |
| 2007/0032947 | A1 | 2/2007 | Yamada et al. |
| 2007/0106475 | A1 | 5/2007 | Kondoh |
| 2007/0182529 | A1 | 8/2007 | Dobler et al. |
| 2007/0182718 | A1 * | 8/2007 | Schoener et al. ........... 345/173 |
| 2008/0174415 | A1 | 7/2008 | Tanida et al. |

FOREIGN PATENT DOCUMENTS

DE    19731285 A1    1/1999

(Continued)

OTHER PUBLICATIONS

International Search Report (Form PCT/ISA/210) for International Application PCT/EP2008/008409, dated Feb. 9, 2009. Written Opinion of the International Search Authority (Form PCT/ISA/237) for International Application PCT/EP2008/008409, dated Apr. 7, 2010.

*Primary Examiner* — Toan N Pham
(74) *Attorney, Agent, or Firm* — Manfred Beck, P.A.

(57) ABSTRACT

A system for providing information to a vehicle occupant includes a haptic control element which is provided in the vehicle and is configured to generate a haptic signal. An electronic control unit is operatively connected to the haptic control element and activates the haptic control element in order to indicate with a haptic signal that information is available for retrieval.

18 Claims, 6 Drawing Sheets

FOREIGN PATENT DOCUMENTS

| | | |
|---|---|---|
| DE | 10211946 C1 | 7/2003 |
| DE | 10204137 A1 | 8/2003 |
| DE | 10324580 A1 | 12/2004 |
| DE | 10326358 A1 | 12/2004 |
| EP | 1049051 A | 11/2000 |
| GB | 2358506 A | 7/2001 |
| WO | 2004053661 A | 6/2004 |

* cited by examiner

SYSTEM AND METHOD FOR PROVIDING INFORMATION IN A VEHICLE

FIELD OF THE INVENTION

The invention relates to a system and a method for providing information to a vehicle occupant.

BACKGROUND OF THE INVENTION

Driver distraction resulting from the use of in-vehicle systems and distraction as a result of performing secondary tasks in addition to operating the vehicle has increased with the ever-increasing amount of information that is made available to the driver and the passengers. For example, a driver may be distracted by a telephone that is ringing and by a voice-operated navigation system that prompts the driver to input address information. These distractions interfere with the driver's ability to focus on the task of driving.

Especially, any visual distraction or any task that requires the driver to take his or her eyes off the road reduces the driving performance and may increase the risk of accidents. Furthermore, tasks that are performed concurrently, such as looking at a monitor on the dashboard of the vehicle while performing the primary task of driving, can have a negative effect on the ability to perform the two tasks in a satisfactory manner.

Any acoustic or optical signal distracts the driver to a certain extent, in particular when the acoustic or optical signal is provided at a time when the driver's workload is increased due to a driving situation that requires the driver's full attention. If information is provided during a critical or dangerous driving situation, the additional demands on the driver can increase the driver's workload and, as a result, the risk of an accident may also increase.

Conventional methods and systems for providing information to the driver thus increase the driver's workload such that the driver may become distracted. The distraction resulting from performing tasks while driving may disadvantageously interfere with the driver's ability to perform the primary task of driving the vehicle.

U.S. Pat. No. 6,812,860 B1 for example describes a system for providing information to an onboard information device in a vehicle. A user interest profile is maintained in a memory of the onboard information device. An onboard communications system determines a location of the user from a positioning signal transmitted by a global positioning system. The system also includes a travel information system such that the travel information system maintains a hierarchically indexed information database and the travel information system provides the onboard communication device with information of interest to the user based on a user profile and the user location. The information is presented on a display screen. A disadvantage of this system is that the user may be distracted by the information displayed on the screen.

U.S. Pat. No. 6,707,421 B1 describes another system for providing information including traffic and navigation information, as well as other information services to a driver. One embodiment of the system makes use of existing components of a wireless telephone system, for example, by using the input and output capabilities of a telephone handset. Another embodiment is a portable system that includes switches for initiating access to a remote server. For instance, the system has switches for initiating traffic information, roadside assistance, personal information, or emergency modes. The system includes a positioning system for generating position data related to a geographic location of the system, and a wireless communication device. The system also includes an audio output device, such as a speaker for presenting the received information. A disadvantage of this system is that the audio output may be presented at an inconvenient time and may distract or interrupt the driver who may be focusing on another task at that moment.

SUMMARY OF THE INVENTION

It is accordingly an object of the invention to provide a system and a method for providing information in a vehicle which overcome the above-mentioned disadvantages of the heretofore-known systems and methods of this general type. It is in particular an object of the invention to provide a system and a method for providing information in a vehicle that reduce distraction when driving the vehicle. Another object of the invention is to provide a system and a method for providing information in a vehicle that adapt to the individual needs of the vehicle occupant and provide information to the vehicle occupant in a manner that does not interfere with the task of driving the vehicle. A further object of the invention is to increase safety by presenting the information in a safe and practical manner. An additional object of the invention is to make the presentation of information more user friendly for the vehicle occupants.

With the foregoing and other objects in view there is provided, in accordance with the invention, in combination with a vehicle, a system for providing information, the system including:

a haptic control element provided in the vehicle and being configured to generate a haptic signal; and an electronic control unit operatively connected to the haptic control element, wherein the electronic control unit activates the haptic control element in order to indicate with a haptic signal that information is available for retrieval.

Conventional control elements or actuating elements in vehicles, such as buttons, switches and knobs, are mostly used for the purpose of a command input. The user of these control elements can assume that each time the control element is actuated, the resulting reaction will always be the same. The control element confirms its actuation for example by a "click" or uses some other acoustic signals or visual displays as a feedback channel. Conventional visual displays and acoustic signals are also used to communicate information. With conventional visual displays and acoustic signals, the time of the visual or acoustic signaling is as a rule event-driven and does not take into account the current situation of the driver and the vehicle.

As described above, an event-driven visual or acoustic signaling that does not take into account the current situation of the driver and/or the current situation of the vehicle may be distracting or may be perceived as annoying if the driver needs to focus on a current driving situation. An advantage of the system and method for providing information in accordance with the invention is that it avoids distracting the user by using a haptic control element for signaling that information can be retrieved. Thus, the system according to the invention does not interfere with the visual and aural perception of information by the user. Another advantage of the system and method for providing information in accordance with the invention is that the haptic control element is configured to announce a message or information that can then advantageously be retrieved whenever the user has time to focus on the message or information.

In accordance with another feature of the invention, the haptic control element is configured as an actuating device such that the information that is available for retrieval is retrieved upon actuating the haptic control element.

In accordance with another feature of the invention, an actuating device is operatively connected to the electronic control unit such that the information that is available for retrieval is retrieved upon actuating the actuating device.

In accordance with a further feature of the invention, a microphone is operatively connected to the electronic control unit; and the electronic control unit is configured to recognize speech wherein the information that is available for retrieval is retrieved with a speech command.

In accordance with yet another feature of the invention, the electronic control unit filters information based on a user profile and activates the haptic control element if user-relevant information is available for retrieval.

According to another feature of the invention, the electronic control unit filters information based on a current driving situation in order to reduce distraction.

In accordance with another feature of the invention, a point of interest database is operatively connected to the electronic control unit for providing information to the electronic control unit; and the electronic control unit filters the information from the point of interest database based on a current position of the vehicle and activates the haptic control element if information related to the current position of the vehicle is available for retrieval.

In accordance with yet another feature of the invention, a transceiver is operatively connected to the electronic control unit, the transceiver is configured to receive information from an external database and/or an external transmitter; and the electronic control unit filters information based on a current position of the vehicle and activates the haptic control element if information related to the current position of the vehicle is available for retrieval.

According to another feature of the invention, a transceiver is operatively connected to the electronic control unit, the transceiver is configured to receive a message such as a text message, a voice message and an e-mail message; and the electronic control unit activates the haptic control element in order to indicate with a haptic signal that the message is available for retrieval.

In accordance with another feature of the invention, the electronic control unit stores a task list including tasks that are related to locations; and the electronic control unit activates the haptic control element if the vehicle is in a vicinity of one of the locations.

In accordance with a further feature of the invention, the haptic control element is mounted on the steering wheel.

In accordance with another feature of the invention, the haptic control element is configured to generate a haptic signal such as a continuous vibration, an intermittent vibration, an electrical stimulation, a change in shape, a change in surface texture, a change in stiffness, a change in temperature, a blocking of a pushbutton function and a movement of the haptic control element. The movable element may for example be a button, a switch, a scroll wheel, or equivalent elements.

According to another feature of the invention, the haptic control element is a movable element having at least a first and a second position, and the haptic control element generates a haptic signal by selectively moving into the first and the second position.

With the objects of the invention in view there is also provided, a method for providing information in a vehicle that includes the steps of:

processing information with an electronic control unit of a vehicle in order to determine user-relevant information;

activating a haptic control element provided in the vehicle in order to provide a haptic signal wherein the haptic signal indicates that user-relevant information is available for retrieval; and subsequently retrieving the user-relevant information.

In accordance with another mode of the invention, the step of processing information with the electronic control unit includes filtering information based on a user profile in order to determine user-relevant information.

In accordance with a further mode of the invention, the step of processing information with the electronic control unit includes filtering information as a function of driving situation data.

In accordance with another mode of the invention, the step of processing information with the electronic control unit includes filtering the information based on a current position of the vehicle.

In accordance with yet another mode of the invention, the step of processing information with the electronic control unit includes filtering information stored in a point of interest database as a function of a current position of the vehicle.

In accordance with another mode of the invention, the step of processing information with the electronic control unit includes checking a task list having tasks related to respective locations and filtering the tasks in the task list as a function of a current position of the vehicle.

Another mode of the invention includes receiving a message such as a text message, a voice message or an e-mail message; and activating the haptic control element in order to indicate with a haptic signal that the message is available for retrieval.

The above-defined haptic control element advantageously allows presenting information with only minimal distraction. Services such as position-dependent information or message-based communications can therefore be presented in an expedient and safe manner.

Other features which are considered as characteristic for the invention are set forth in the appended claims.

Although the invention is illustrated and described herein as embodied in a system and a method for providing information to a user in a vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
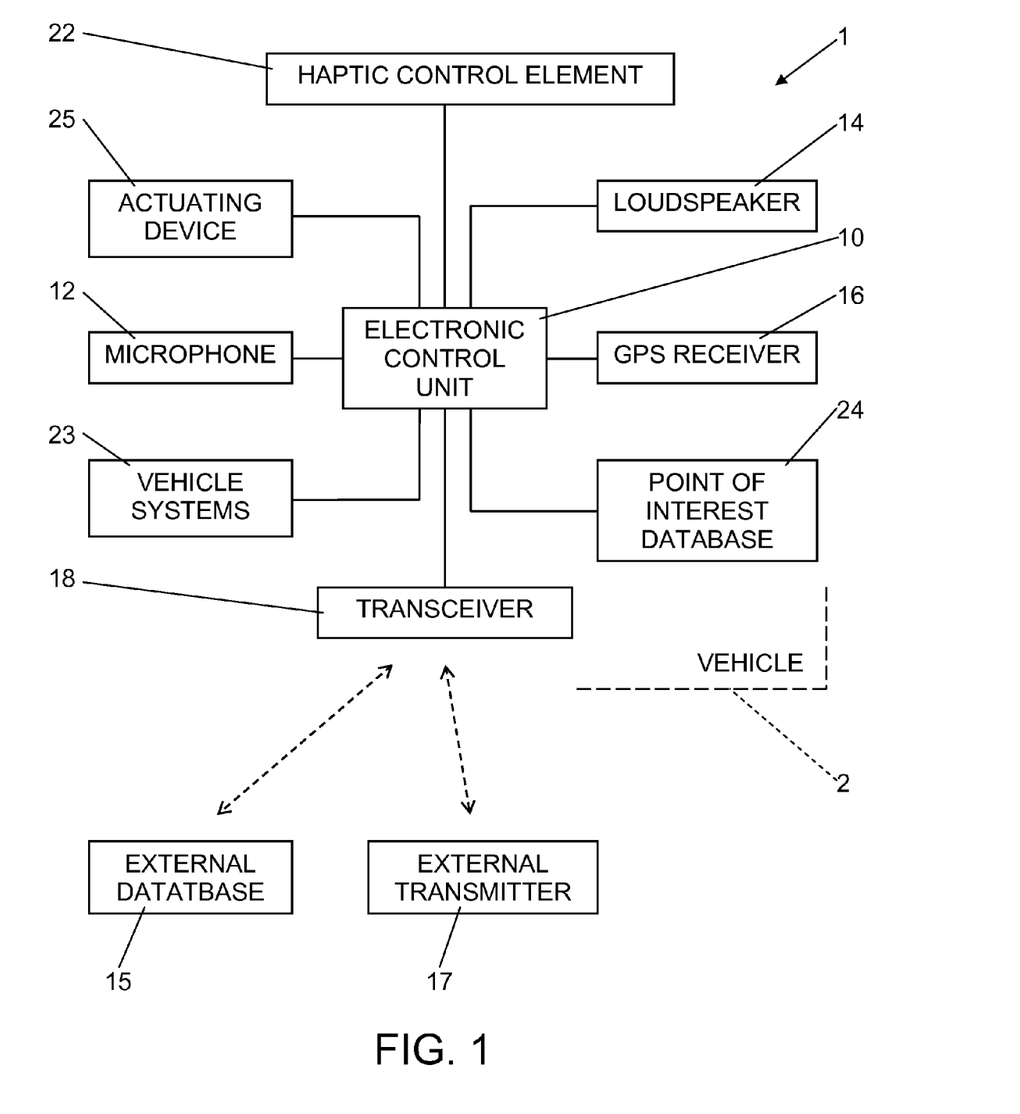
FIG. 1 is a block diagram illustrating in an exemplary manner components to be used in a system according to the invention.

Referring now to the figures of the drawings in detail and first, particularly, to FIG. 1 thereof, there is shown a block diagram illustrating in an exemplary manner components to be used in an information system 1 according to the invention. An electronic control unit (ECU) 10 serves as a central processing unit of the information system 1. The electronic control unit 10 is connected to a microphone 12 for providing an audio input to the electronic control unit 10. A loudspeaker 14 is connected to the electronic control unit 10 in order to provide an audio output. Furthermore, a GPS (global positioning system) receiver 16 is connected to the electronic control unit 10 in order to provide position information. In addition to the GPS receiver 16, a transceiver 18 which may for example be a GSM (Global System for Mobile Communications) transceiver, a UMTS (Universal Mobile Telecommunications System) transceiver, or some other kinds of transceiver which allows transmitting and/or receiving data in a communications network such as a telephone network or the Internet.

Vehicle systems, which are schematically indicated by reference numeral 23, are also connected to the electronic control unit 10. Furthermore, a haptic control element 22, which is described in detail below, is connected to the electronic control unit 10. The information system 1 is integrated into a vehicle 2, which is only schematically indicated by a dashed line. FIG. 1 also shows an external database 15, which may for example be a centralized database storing information about points of interest, traffic information, map data, and other data of interest for the driver or passenger of the vehicle 2. In addition, an external transmitter 17 may transmit information to the vehicle 2. An example for an external transmitter 17 would be a short-range transmitter that a business uses to send out information to vehicles driving past the business.

An exemplary mode of operation of the information system 1 shown in FIG. 1 is described in the following. The electronic control unit 10 uses information provided by the GPS receiver 16 in order to reconcile a current position of the vehicle 2 with a point of interest (POI) database 24 and generates messages as necessary. The point of interest database 24 may be integrated in the information system 1 or may be an external, central point of interest database 15 or a combination of an integrated and an external, central point of interest database.

The messages generated by the electronic control unit 10 are then filtered based on a user profile, which stores user preferences and user interests, and based on data provided by the vehicle systems 23. If a message is determined to be interesting or useful for the user, then the fact that there is an interesting or useful message is signaled to the user via the haptic control element 22. The user will generally be the driver of the vehicle; however, any passenger in the vehicle may be a user of the information system 1. If the driver wants to retrieve the message, then the electronic control unit 10 performs a speech synthesis of the text message and outputs the text message via the loudspeaker 14 of the vehicle 2.

The electronic control unit 10 can transmit and receive messages such as instant messages (Instant Messaging) and e-mail messages via a wireless Internet connection. SMS (Short Message Service) messages can be sent and received via a GSM/UMTS network or some other cellular network. The receipt of a new message is signaled by the haptic control element 22. If the user wants to retrieve the message, the user actuates the haptic control element 22. Alternatively, the retrieval of the message may be prompted by actuating an actuating device 25, such as a button or a switch that is separate from the haptic control element 22. In accordance with a further alternative, the retrieval of the message may be prompted by a voice command of the user. The message can also be transformed into speech and can be read to the user.

In accordance with an embodiment of the invention, a message can be sent by keeping the haptic control element actuated, for example by pressing and holding the haptic control element 22 depressed, and dictating a message into the microphone 12 while keeping the haptic control element 22 depressed. The spoken message is then transformed into text by a speech recognition function of the electronic control unit 10. After the message has been converted into text, the message is sent out via a data connection.

Figure 2:
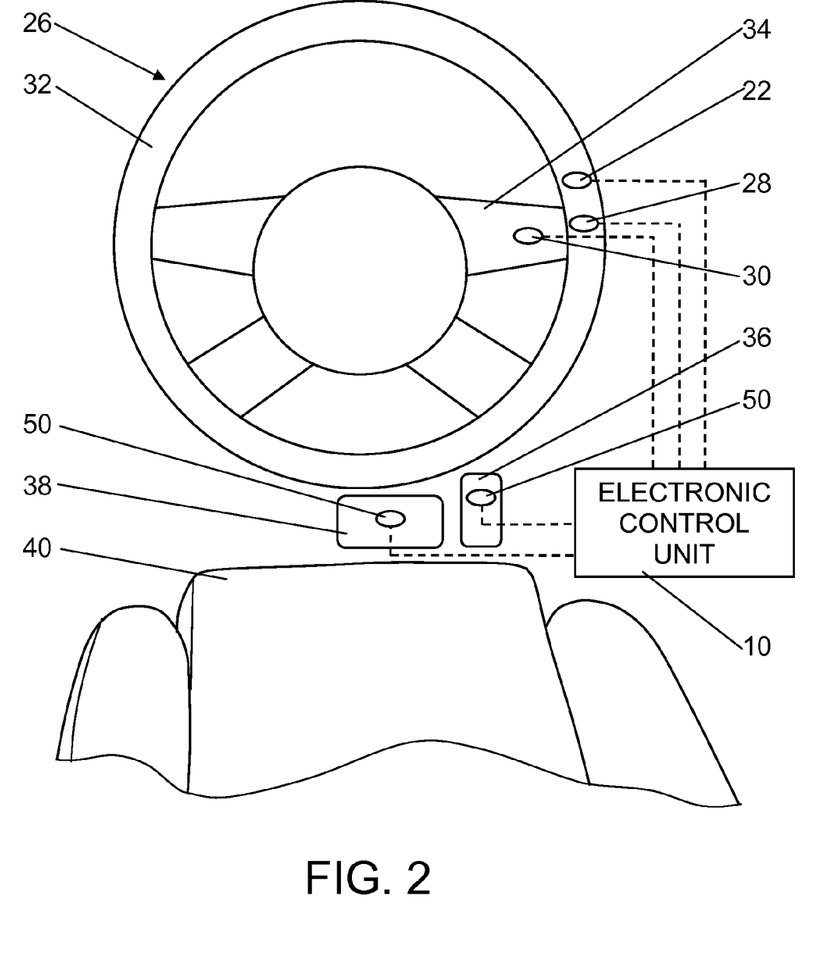
FIG. 2 is a diagrammatic partial view of the interior of a vehicle with haptic control elements in accordance with the invention.

FIG. 2 is a diagrammatic partial view of the interior of the vehicle 2. FIG. 2 shows a steering wheel 26 equipped with haptic control elements 22, 28, 30 in accordance with the invention. The steering wheel 26 has a steering wheel rim 32 and a steering wheel spoke 34. The haptic control elements 22, 28, 30 are preferably placed on the steering wheel rim 32 and on the steering wheel spoke 34 in positions where they can be easily reached and touched by the user. In the exemplary embodiment shown in FIG. 2, the user can reach the haptic control elements 22, 28, 30 with his or her right thumb while holding the steering wheel.

In principle, the haptic control element could be placed anywhere in the vehicle as long as the haptic control element is configured such that it allows the user to feel the haptic signals. For example, a haptic control element 50 could be mounted on a foot-operated pedal such as the accelerator pedal 36 or the brake pedal 38. A haptic control element could in principle also be mounted in the vehicle seat 40.

Figure 3:
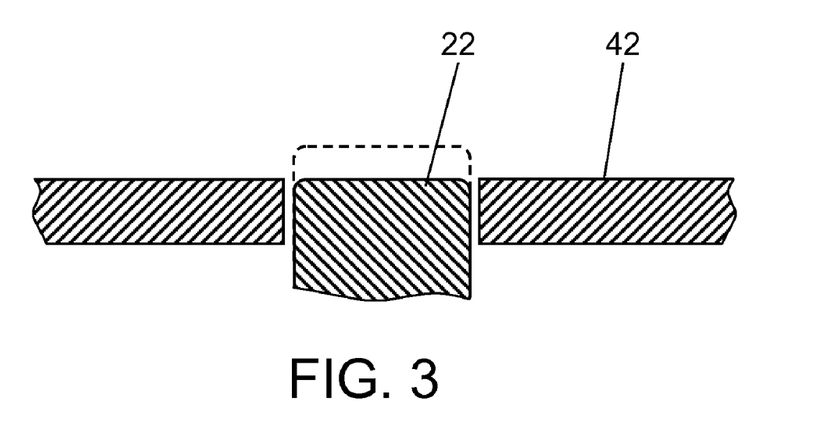
FIG. 3 is a diagrammatic partial sectional view of an embodiment of a haptic control element according to the invention.

FIG. 3 is a diagrammatic partial sectional view of an exemplary embodiment of a haptic control element 22 embodied as a push button 22. The haptic control element 22 has a first position in which the surface of the top of the push button 22 extends substantially at the same level as the mounting surface 42. The haptic control element 22 embodied as the push button 22 furthermore has a second position which is indicated by a dashed line in FIG. 3. When the push button 22 is in its second position, the top of the push button 22 protrudes beyond the mounting surface 42 in order to provide a haptic feedback to the user. The haptic control element 22 shown in FIG. 3 may for example be used as a single push button 22 on the steering wheel 26. Alternatively, a row of push buttons 22 or an array of push buttons may be provided.

Figure 4:
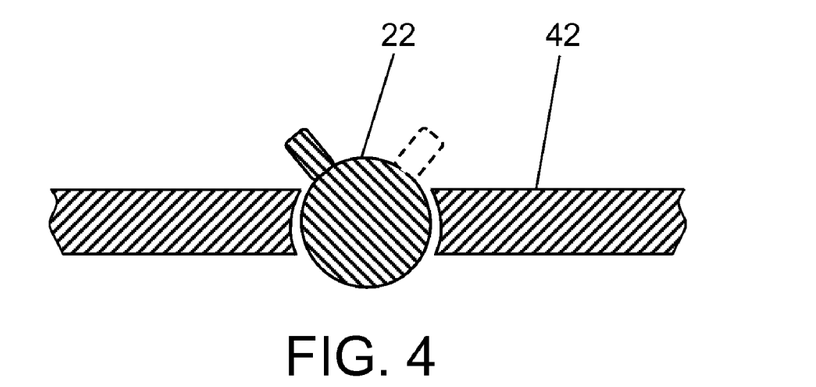
FIG. 4 is a diagrammatic partial sectional view of a further embodiment of a haptic control element according to the invention.

FIG. 4 is a diagrammatic partial sectional view of another exemplary embodiment of a haptic control element 22 embodied as a flip switch 22. The haptic control element 22 has a first position in which the flip switch 22 points in a first direction. The haptic control element 22 embodied as the flip switch 22 furthermore has a second position, shown by a dashed line, in which the flip switch 22 points in a second direction.

Figure 5:
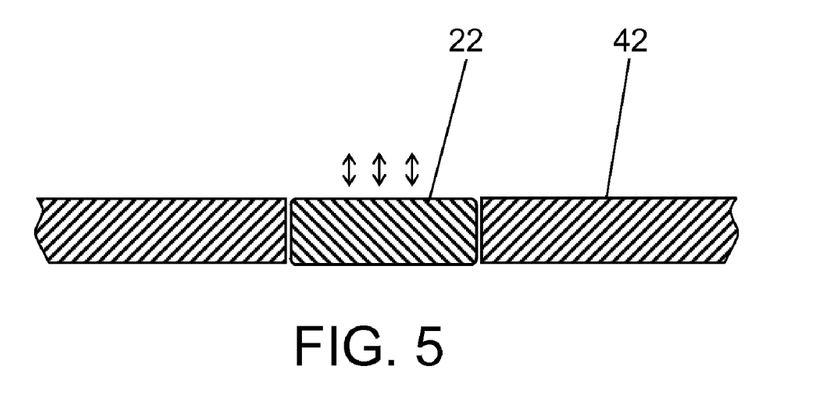
FIG. 5 is a diagrammatic partial sectional view of another embodiment of a haptic control element according to the invention.

FIG. 5 is a diagrammatic partial sectional view of a further exemplary embodiment of a haptic control element 22 embodied as a vibrating button 22. The haptic control element 22 shown in FIG. 5 vibrates in order to provide a haptic feedback. The vibration is indicated by the double-headed arrows in FIG. 5. The vibrating button 22 may furthermore be capacitively controlled such that the vibrating button 22 vibrates only when the user touches the haptic control element 22 or the user gets in close proximity to the vibrating button 22. The vibrating button 22 can be controlled to vibrate in a continuous manner, to vibrate in an intermittent manner, to vibrate in different frequencies and/or amplitudes in order to indicate different types or categories of information to the user.

Figure 6:
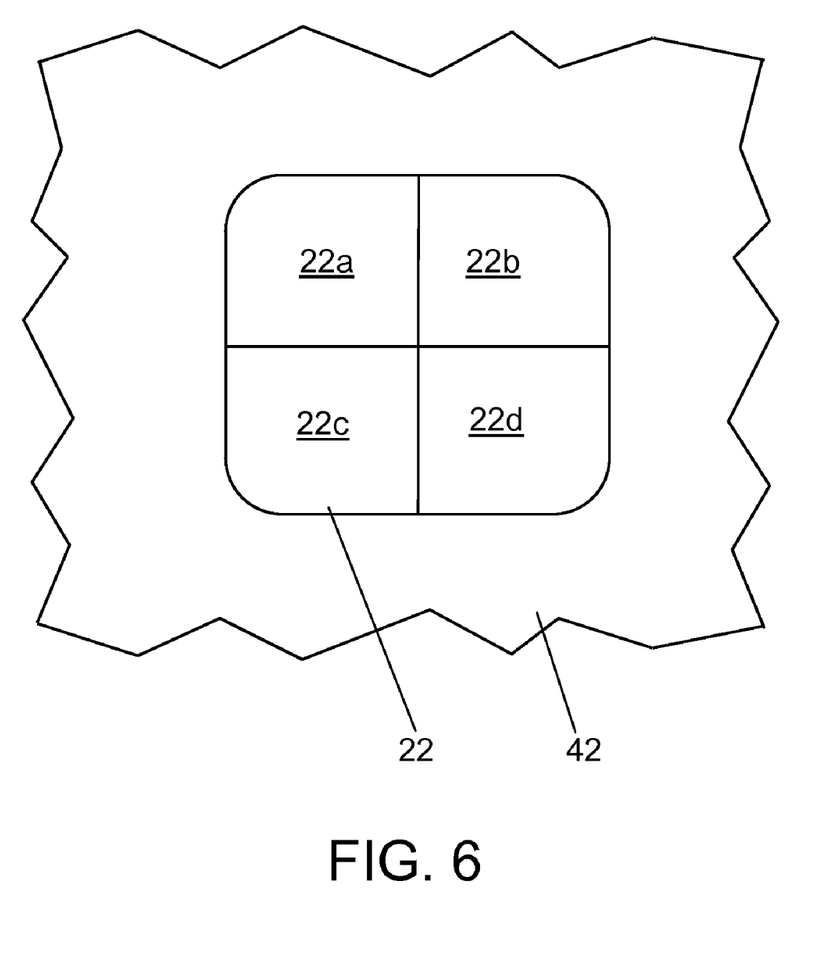
FIG. 6 is a diagrammatic partial top plan view of an embodiment of a haptic control element according to the invention.

In addition to being embodied as a push button, a flip switch or a vibrating button, the haptically changeable control element may be embodied as one or more scroll wheels, rotary dials, rollers, levers, touchpads, keyboards or other control devices or actuating devices to be operated by a user. For example, FIG. 6 is a diagrammatic top plan view of a haptic control element 22 with four sections 22a, 22b, 22c, 22d wherein each section may be configured to haptically signal a different type or category of information.

Further, as mentioned above, the haptic control element can be embodied as an element to be operated with a foot or a leg (e.g. accelerator pedal or brake pedal). The haptic feedback or the information transfer can be carried out in different ways, e.g. by vibration as mentioned above, by an electrical stimulation, by changing the shape of the haptic control element, by changing the surface characteristics (e.g. changing the texture of the surface, changing the hardness or stiffness of the surface), by varying the temperature of the surface of the haptic control element, by blocking the function of a push button (i.e. the push button can no longer be depressed), by a movement of the push button (e.g. the push button protrudes/retracts or moves in another direction).

The described haptic properties can also be combined with one another or can be varied. For example, the haptic control elements can vibrate in different vibrating modes (constant vibration, intermittent vibration etc.). The haptic control element can also be operated such that it vibrates in one operating mode and changes its shape in another operating mode. In order to further reduce driver distraction, the haptic control element may advantageously be embodied such that the different states of the haptic control element can only be felt but cannot be seen when looking at the haptic control element.

The described haptic control element allows the implementation of different applications. If the haptic control element 22 is a so-called soft-key, i.e. it has different functions, then the different functions or operating states can be signaled by corresponding haptic properties. For example, the haptic control element 22 may in this case vibrate in a certain manner (frequency, amplitude etc.) for a first function and may vibrate in a different manner (frequency, amplitude etc.) for a second function.

Figure 7:
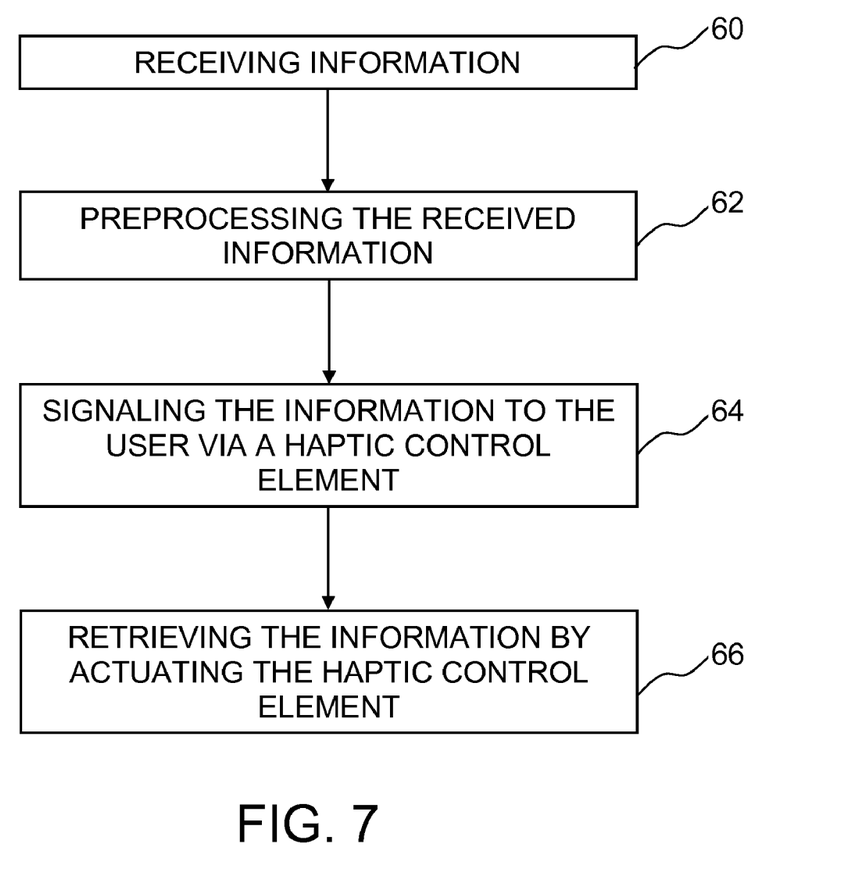
FIG. 7 is a flow chart illustrating basic method steps of an exemplary mode of the method according to the invention.

An exemplary basic mode of operation of the invention is described with reference to FIG. 7, which shows how information that is received in an information system is signaled to a user. If new information is received in step 60, then the haptic feedback becomes active. In other words, the haptic control element 22 vibrates, changes its shape, or signals in some other haptic manner the receipt of information to the user in a step 64. The haptic signaling or haptic feedback is preferably provided such that the signaling is not visible for the user. For example, the haptic signaling is provided by a vibration that can be felt but cannot be seen. As a result, there is no distraction on the visual channel and the user does not take his or her eyes off the road.

Furthermore, if the haptic signaling or haptic feedback can only be felt when the user touches the haptic control element, then a mixed form of supplying information, which includes a supply-oriented information supply and a demand-oriented information supply, is possible. This means that information is offered to the user; however, the receipt of new information is pointed out to the user only if the user touches the haptic control element. The corresponding information is advantageously retrieved by actuating the haptic control element.

As a result of the above-described properties, the user can decide for himself or herself when he/she wants to be notified about the receipt of new information and the user can decide if or when he/she wants to retrieve the new information. The user will retrieve the new information mainly in situations when the user is not occupied with other tasks. That means that as a result of these properties, the potential for a distraction caused by the information system is small. FIG. 7 also shows that the received information can be preprocessed in a step 62. The preprocessing of information may take into account a user profile, GPS information and further criteria as described below. After the haptic control element 22 signals to the user that information has been received, the user can retrieve the information by actuating the haptic control element 22 in step 66.

Figure 8:
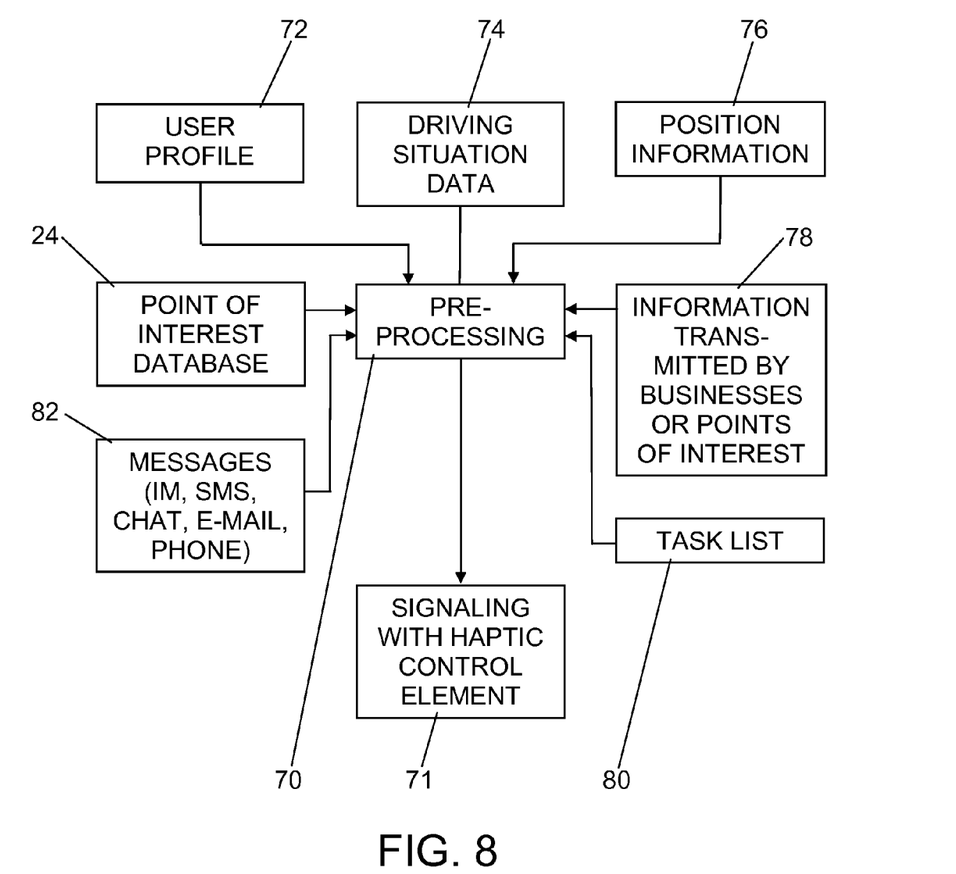
FIG. 8 is a schematic overview illustrating in an exemplary manner factors that may be taken into account for processing information in accordance with the invention.

In accordance with an advantageous mode of the invention, the incoming information is pre-processed such that the user receives only those portions of the incoming information that are interesting or important for the user. FIG. 8 provides a schematic overview of exemplary factors that may be taken into account for the pre-processing operation indicated by block 70. It is in particular advantageous if the user can set priorities with respect to the information that the user prefers to receive. By sorting the information into different categories, the user may be better able to set his or her priorities. The priorities of the user can be stored as a user profile 72. The pre-processing may for example be performed by a filter. The filter decides which information is to be delivered to the user based on a variety of conditions. This filter can be based on the user profile 72 which is an interest profile provided by the user. The user profile 72 is preferably an adaptive user profile. For example, if the user aborts the output of information related to a certain category several times, then this category will have a lower priority in the future.

Moreover, the filter that is used for the pre-processing can operate in dependence on the driving situation. In accordance with a preferred mode, the amount of information that is delivered to the user decreases with an increasing workload of the user. In an extreme case, the delivery of information to the user may be stopped if the filter decides that the workload of the user is high. The determination of the driving situation is made based on driving situation data 74 which may include general data such as date (season) and time, daytime light or ambient light intensity, and surroundings (city versus countryside). The driving situation data 74 may furthermore include navigation data (type of road, intersections etc.), driving dynamics values (current speed, longitudinal acceleration, lateral acceleration etc.) and data of other vehicles (for example relative speeds with respect to other vehicles and distances from other vehicles).

The pre-processing 70 may also include a sorting of the information as mentioned above. The information is sorted into categories that can be selected by the user. If the haptic control element 22 has several buttons 22a, 22b, 22c, 22d as is shown in FIG. 6, then each of these buttons 22a, 22b, 22c, 22d can be assigned to a category of information. These information categories can be configured in an arbitrary manner. If the buttons 22a, 22b, 22c, 22d are individually controlled to provide a respective haptic response, then each individual button signals the presence of new information and implicitly provides an indication about the category to which the incoming information belongs. An alternative way of distinguishing between different categories of information is possible by using different modes of haptic signaling 71. A button may for example vibrate continuously in order to indicate that the new information belongs to a first category and the same button may vibrate intermittently in order to indicate that the new information belongs to a second category. This allows the user to differentiate between the categories of information and thus it is possible for the user to make a decision whether and when information of a certain category will be retrieved.

An exemplary use of the information system 1 according to the invention is supplying position-dependent information to a user. This requires a determination of the user's own position by using a global positioning system (GPS, Galileo) for providing position information 76. A so-called point of interest database (POI database) 24 stores point locations and location-related information. Potentially interesting information about the surrounding area is then offered to the user by using the haptic control element 22 for signaling the existence of potentially interesting information to the user. If the user drives for example past a church, then the haptic control element 22 signals that information can be retrieved. The user can then retrieve information, preferably background information, about the church that is in the user's vicinity.

The point of interest database can be stored locally in the vehicle. The point of interest database can also be a centralized database 15 that is made available by connecting to the internet or some other network. A central database 15 offers the advantage that information can be easily updated and thus it is possible to offer information about current occurrences such as current events, shows, or performances of any type.

In addition or as an alternative to the above-described combination of a position determination and a database, such as a point of interest database, the information system according to the invention can be configured to operate based on a wireless communication between the information system 1 and points of interest such as landmarks, businesses or venues. These localities can transmit information 78, which is then received by the information system 1 according to the invention. The information system 1 filters the received information and, if appropriate, signals the information via the haptic control element 22.

In accordance with a further embodiment, the position-dependent information processing as described above can be augmented or combined with other user-specific data such as shopping lists, to-do lists or other task lists 80. If the information system 1 stores a shopping list or a list of errands, then this list can be used for filtering information and for reminding the user with the haptic control element 22. In this case, the haptic control element 22 would be activated in order to provide a reminder signal to the user when the user drives past a store that sells some of the items on the shopping list. If the list of errands includes the task of getting cash from an ATM (automatic teller machine), then the haptic control element 22 would remind the user when the user is close to an ATM or bank. In other words, the information system according to the invention provides a position-dependent reminder function.

The information system 1 according to the invention can furthermore be expanded to include vehicle data. For example, if the information system 1 knows that the fuel level in the gas tank is low, then the haptic control element 22 can give a reminder when a gas station is nearby.

A further exemplary use of the information system 1 according to the invention is in the field of message transmission. In this case, the haptic control element 22 is used in combination with other input devices and output devices for communication purposes. The information system 1 is in this case not only used for receiving information or messages but is also used for transmitting information or messages. The types of messages 82 include for example chat messages, instant messaging, (push) e-mail, and SMS. Incoming messages are preferably output via a speech synthesis system and outgoing messages are preferably converted into text by a speech recognition system. If the haptic control element 22 has a plurality of buttons 22a, 22b, 22c, 22d or equivalent signaling elements, then the different buttons or signaling elements can be assigned to different types of messages or different conversation partners.

The above described information system is not only advantageous for the driver as the user, but is also advantageous for other vehicle occupants. The passengers can use the provided information in substantially the same manner as the driver. Since the haptic control element does not distract the passenger, the passenger can focus on other tasks. In addition, the driver will be less distracted by the activities of the passengers in the vehicle if the passengers use an information system according to the invention.

What is claimed is:

1. In combination with a vehicle, a system for providing information, comprising:
   a haptic control element provided in the vehicle and being configured to generate a haptic signal; and
   an electronic control unit operatively connected to said haptic control element, wherein said electronic control unit activates said haptic control element in order to indicate with a haptic signal that information is available for retrieval, wherein said electronic control unit filters information based on a user profile and activates said haptic control element if user-relevant information is available for retrieval.

2. The system according to claim 1, wherein said haptic control element is configured as an actuating device such that the information that is available for retrieval is retrieved upon actuating said haptic control element.

3. The system according to claim 1, including an actuating device operatively connected to said electronic control unit such that the information that is available for retrieval is retrieved upon actuating said actuating device.

4. The system according to claim 1, including:
   a microphone operatively connected to said electronic control unit; and
   said electronic control unit being configured to recognize speech wherein the information that is available for retrieval is retrieved with a speech command.

5. The system according to claim 1, wherein said electronic control unit filters information based on a current driving situation in order to reduce distraction.

6. The system according to claim 1, including:
   a point of interest database operatively connected to said electronic control unit for providing information to said electronic control unit; and
   said electronic control unit filtering the information from said point of interest database based on a current position of the vehicle and activating said haptic control element if information related to the current position of the vehicle is available for retrieval.

7. The system according to claim 1, including:
a transceiver operatively connected to said electronic control unit, said transceiver being configured to receive information from at least one of an external database and an external transmitter; and
said electronic control unit filtering information based on a current position of the vehicle and activating said haptic control element if information related to the current position of the vehicle is available for retrieval.

8. The system according to claim 1, including:
a transceiver operatively connected to said electronic control unit, said transceiver being configured to receive a message selected from the group consisting of a text message, a voice message and an e-mail message; and
said electronic control unit activating said haptic control element in order to indicate with a haptic signal that the message is available for retrieval.

9. The system according to claim 1, wherein:
said electronic control unit stores a task list including tasks that are related to locations; and
said electronic control unit activates said haptic control element if the vehicle is in a vicinity of one of the locations.

10. The system according to claim 1, including a steering wheel, said haptic control element being mounted on said steering wheel.

11. The system according to claim 1, wherein said haptic control element is a movable element having at least a first and a second position, and said haptic control element generates a haptic signal by selectively moving into the first and the second position.

12. A method for providing information in a vehicle, the method which comprises:
processing information with an electronic control unit of a vehicle in order to determine user-relevant information, wherein the step of processing information with the electronic control unit includes filtering information based on a user profile in order to determine user-relevant information;
activating a haptic control element provided in the vehicle in order to provide a haptic signal wherein the haptic signal indicates that user-relevant information is available for retrieval; and
subsequently retrieving the user-relevant information.

13. The method according to claim 12, wherein the step of processing information with the electronic control unit includes filtering information as a function of driving situation data.

14. The method according to claim 12, wherein the step of processing information with the electronic control unit includes filtering the information based on a current position of the vehicle.

15. The method according to claim 12, wherein the step of processing information with the electronic control unit includes filtering information stored in a point of interest database as a function of a current position of the vehicle.

16. The method according to claim 12, wherein the step of processing information with the electronic control unit includes checking a task list having tasks related to respective locations and filtering the tasks in the task list as a function of a current position of the vehicle.

17. The method according to claim 12, which comprises:
receiving a message selected from the group consisting of a text message, a voice message and an e-mail message; and
activating the haptic control element in order to indicate with a haptic signal that the message is available for retrieval.

18. In combination with a vehicle, a system for providing information, comprising:
a haptic control element provided in the vehicle and being configured to generate a haptic signal, wherein said haptic control element is configured to generate a haptic signal selected from the group consisting of a continuous vibration, an intermittent vibration, an electrical stimulation, a change in shape, a change in surface texture, a change in stiffness, a change in temperature, a blocking of a pushbutton function and a movement of the haptic control element; and
an electronic control unit operatively connected to said haptic control element, wherein said electronic control unit activates said haptic control element in order to indicate with a haptic signal that information is available for retrieval.

* * * * *